(12) United States Patent
Babcock

(10) Patent No.: US 8,567,135 B2
(45) Date of Patent: Oct. 29, 2013

(54) GRAIN STORAGE PIT

(76) Inventor: Ken Babcock, Hiawatha, KS (US)

( * ) Notice: Subject to any disclaimer, the term of this patent is extended or adjusted under 35 U.S.C. 154(b) by 264 days.

(21) Appl. No.: 13/102,131

(22) Filed: May 6, 2011

(65) Prior Publication Data
US 2011/0277404 A1      Nov. 17, 2011

Related U.S. Application Data

(60) Provisional application No. 61/334,374, filed on May 13, 2010.

(51) Int. Cl.
*E04H 7/30*          (2006.01)
(52) U.S. Cl.
CPC .................................... *E04H 7/30* (2013.01)
USPC ............... 52/193; 52/195; 141/286; 141/325
(58) Field of Classification Search
USPC .................... 52/193, 195, 192, 194, 196, 197; 141/98, 99, 286, 325; 414/376
See application file for complete search history.

(56) References Cited

U.S. PATENT DOCUMENTS

| | | | | |
|---|---|---|---|---|
| 4,529,085 A | * | 7/1985 | Johnson | 198/532 |
| 4,566,232 A | * | 1/1986 | Klein-Albenhausen | 52/195 |
| 5,544,686 A | * | 8/1996 | Kearney | 141/192 |
| 5,893,399 A | * | 4/1999 | Kearney | 141/286 |
| 7,128,104 B1 | * | 10/2006 | Haraway | 141/286 |
| 7,637,695 B1 | * | 12/2009 | Akkala | 405/118 |
| 2008/0131242 A1 | * | 6/2008 | Duffy et al. | 414/311 |

* cited by examiner

*Primary Examiner* — William Gilbert
(74) *Attorney, Agent, or Firm* — Hovey Williams LLP

(57) ABSTRACT

A grain storage pit includes an open-top chamber configured to be substantially flush-mounted in a surface and a grain-receiving grate that covers at least a portion of the open-top chamber so that grain may be poured into the open-top chamber through the grate from a truck positioned over the pit. The grain storage pit may also include one or more unloading ports for facilitating removal of grain from the pit.

7 Claims, 4 Drawing Sheets

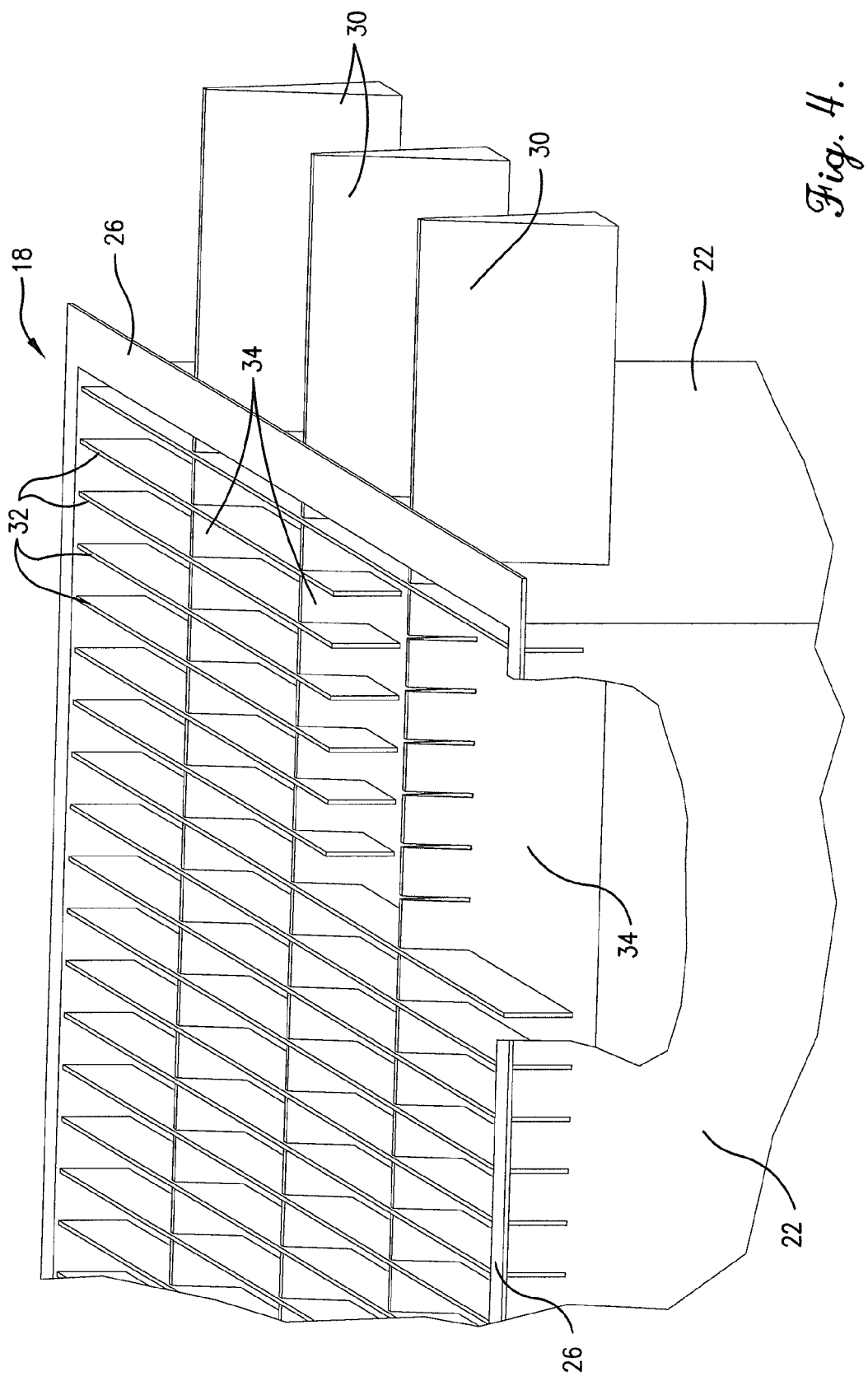

GRAIN STORAGE PIT

RELATED APPLICATION

This non-provisional patent application claims priority benefit with regard to all common subject matter of the earlier filed U.S. Provisional Patent Application titled "GRAIN RECEIVING PIT", Ser. No. 61/334,374, filed on May 13, 2010, which is hereby incorporated by reference in its entirety into the present application.

BACKGROUND

Corn, wheat, rice, sorghum, millet and other grains are produced on a seasonal basis and therefore must be stored between harvests to meet year-round demand. Grain is typically stored in above-ground storage bins, silos, or other enclosures and must be lifted into these enclosures by conveyor systems, augers, and other conveying devices. Known grain storage devices are also not suitable for installation and use with smaller grain operations.

SUMMARY

The present invention provides a grain storage device that can receive grain directly from a truck or other vehicle without the use of conveyor systems, augers, etc. The grain storage device of the present invention is also ideally suited for smaller grain operations and/or in applications with limited installation space.

An embodiment of the invention is a grain storage pit broadly comprising an open-topped chamber, a covering grate, and at least one unloading port. The chamber is configured to be substantially flush-mounted in a surface such as a concrete pad and comprises a number of generally vertically-extending sidewalls, a lower collection area defined by a number of inwardly-sloped bottom walls depending from the vertically-extending sidewalls; and an upper circumferential lip.

The covering grate covers the open top of the chamber and permits grain to be directly poured in the chamber without the need for conveyer systems. Embodiments of the covering grate are configured to control the rate at which grain is deposited in the chamber.

The unloading port is in communication with the interior of the chamber for facilitating removal of grain from the chamber. One embodiment of the unloading port is an unloading tube sized and configured for receiving an auger for removing the grain from the chamber. Another embodiment of the unloading port may comprise a port or other opening in the lower collection area for discharging grain from the bottom of the pit.

The storage pit may be installed in an excavated hole surrounded by a concrete pad or other surface. Concrete approaches may be poured around the pit so that trucks may drive directly up to the storage pit and dump or otherwise unload grain into it through the grain-receiving grate. Grain may be subsequently removed from the storage pit with an auger that fits inside the unloading port.

The storage pit may also be supported in the roof or ceiling of a structure so that trucks may drive on the structure and dump grain into the storage pit and other trucks may drive into the structure and under the storage pit to remove grain from the storage pit. Grain may be discharged from the bottom of the chamber directly into a truck or onto a conveyor or other transport mechanism.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein:

FIG. 4 is a partial perspective view of an embodiment of the covering grate with parts broken away.

Figure 1:
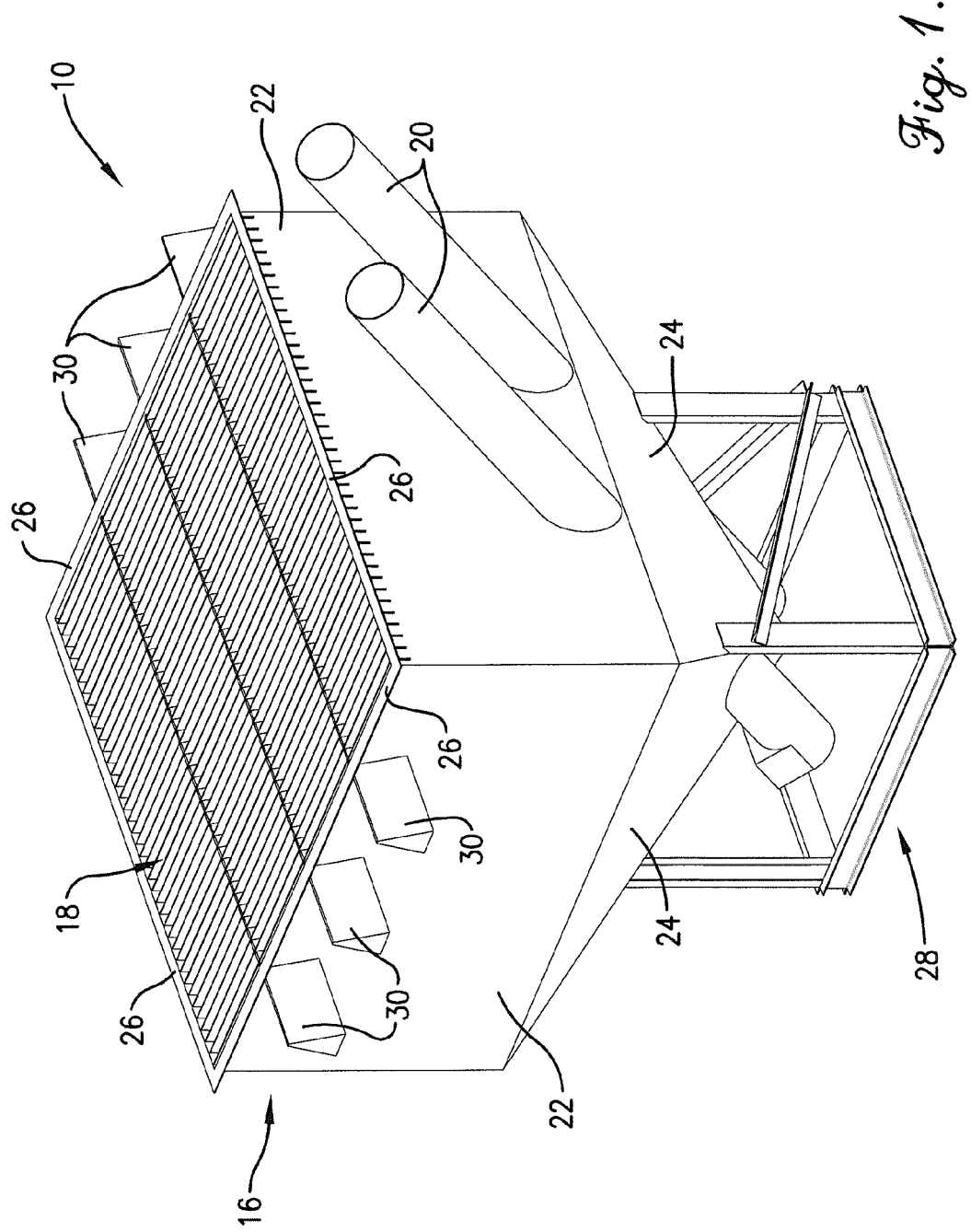
FIG. 1 is a perspective view of a grain storage pit constructed in accordance with an embodiment of the invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of embodiments of the invention references the accompanying drawings. The embodiments are intended to describe aspects of the invention in sufficient detail to enable those skilled in the art to practice the invention. Other embodiments can be utilized and changes can be made without departing from the scope of the claims. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 2:
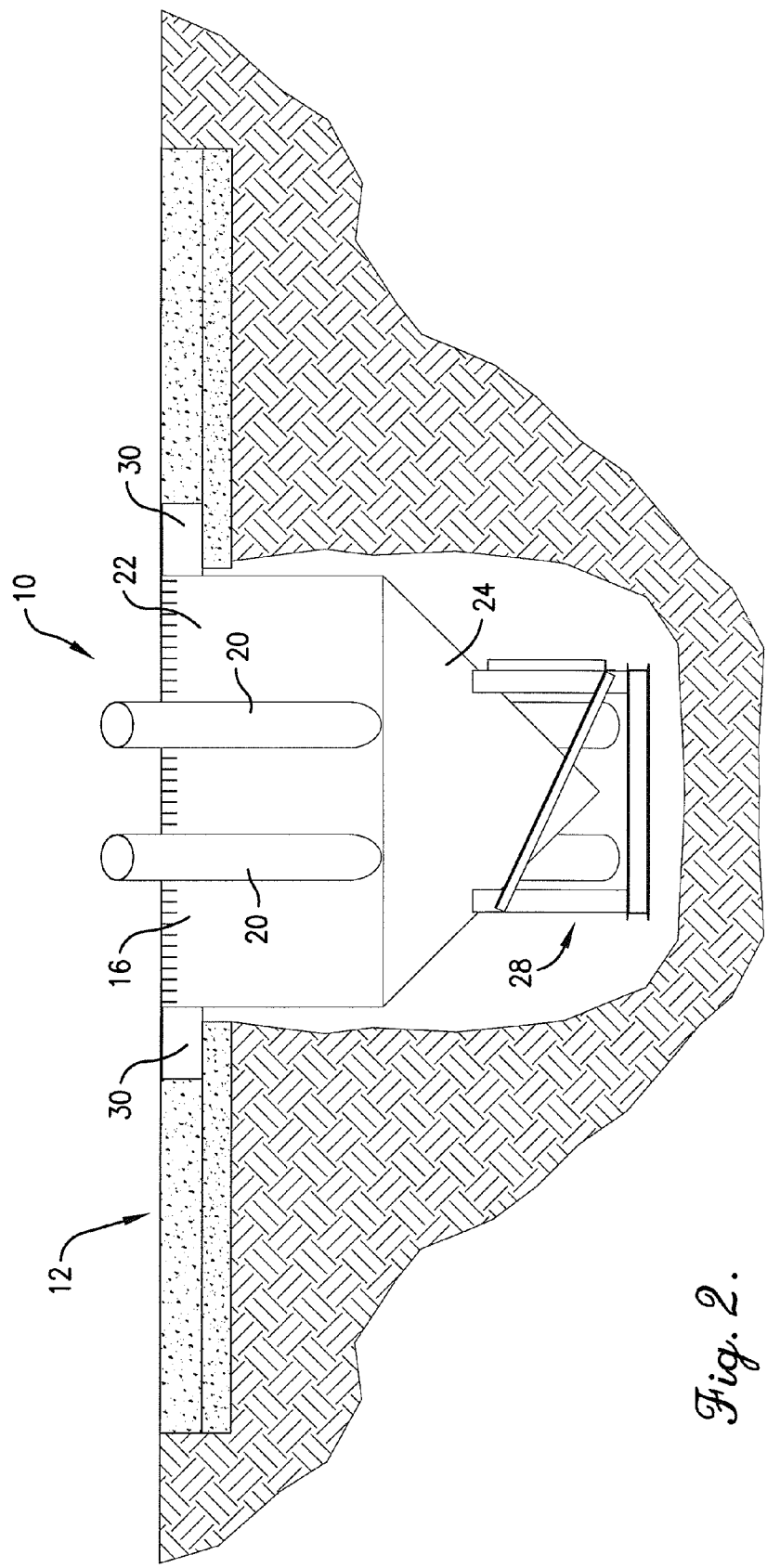
FIG. 2 is an elevational view in partial section depicting installation of the grain storage pit in the ground.
Figure 3:
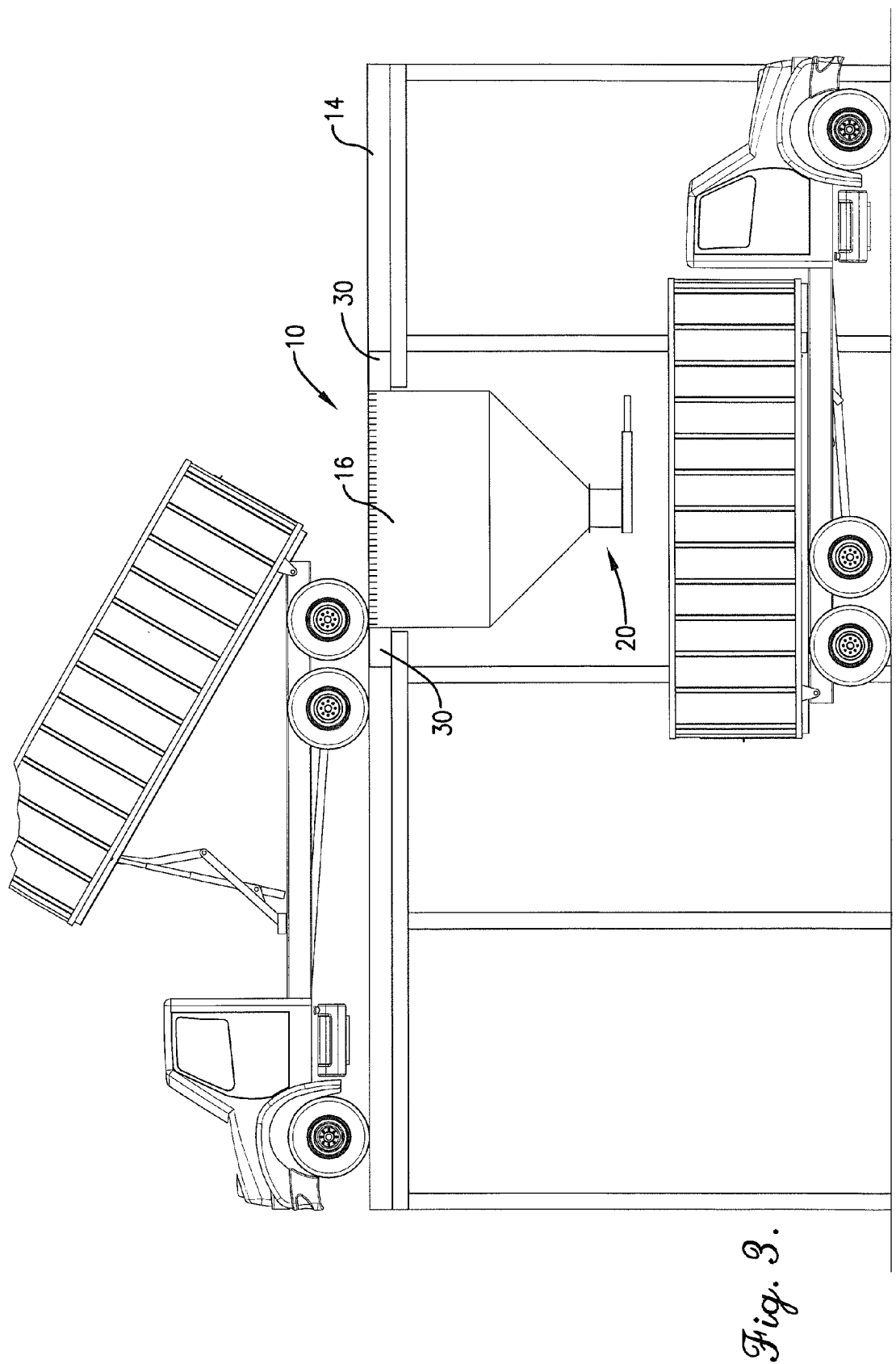
FIG. 3 is an elevational view depicting installation of the grain storage pit in a structure.

Turning now to the drawing figures, and particularly FIG. 1, a grain storage pit 10 constructed in accordance with an embodiment of the invention is illustrated. The grain storage pit 10 may be installed in the ground and substantially flush-mounted in a concrete pad 12 or other surface as depicted in FIG. 2 or installed above a garage, basement, or other structure 14 and substantially flush-mounted in the upper surface of the structure as depicted in FIG. 3. The grain storage pit 10 broadly comprises an open-topped chamber 16, a covering grate 18, and one or more unloading ports 20.

The chamber 16 may be any device capable of holding grain. An embodiment of the chamber 16 comprises four generally vertically-extending sidewalls 22 that form a box-shaped structure with an open top. Four generally triangular-shaped and inwardly-sloping bottom walls 24 depend from the sidewalls and join together at their apexes to define a lower gravity fed collection area within the chamber. Four generally flat bars 26 are attached to or integrally formed with the top edges of the sidewalls 22 to form a square frame or lip around the chamber.

The sidewalls 22 and bottom walls 24 of the chamber are preferably formed of heavy-duty materials such as 3/16" or 1/4" steel and are welded or otherwise attached together. The chamber may be fabricated in any size and shape, and in one embodiment is approximately 10 ft. long, 10 ft. wide, and 4-8 ft. deep. A base 28 formed from several metal frame members and cross supports may be welded or otherwise attached to the bottom of the chamber 16 to support the chamber in an upright position before it is installed. The base 28 may also assist in supporting the storage pit 10 when it is installed in the ground as described in more detail below.

The grate 18 covers the open-top of the chamber 16 and allows grain to be directly poured into the pit from above without the use of conveyor systems, augers, etc. The grate 18 also has structure for controlling the flow of grain into the chamber as described below. The grate also permits people to walk over and vehicles to drive over the pit.

An embodiment of the grate 18 is best illustrated in FIG. 4 and is formed from a number of elongated supports 30 and a plurality of cross treads 32. The supports 30 are triangular in cross section and formed of 0.1875" thick steel or other metal. The triangular shape of the supports provides sloped walls 34 that slow the flow of grain into the pit to prevent damage to the grain. In one embodiment, the sloped walls 34 of each support are approximately 11" long and connected at their lower ends by a base that is approximately 6" wide.

The supports 30 are longer than the chamber so that the ends of the supports extend beyond the chamber for supporting the pit during installation as described below. For a 10'× 10' chamber, the supports are approximately 13' long. Any number of supports may be provided, depending on the size of the chamber and anticipated load on the grate.

As shown in FIG. 4, the portions of the supports 30 inside the boundaries of the chamber 16 are notched to receive and support the cross treads 32. In one embodiment, the notches are spaced approximately 3" apart and are approximately 2" deep.

The cross treads 32 are aligned in the notches of the supports 30 and extend perpendicular to the supports. The cross treads 32 may be formed from elongated steel slats or bars, and in one embodiment are approximately 4" tall and 10' long. The cross treads 32 may extend above the apexes of the supports 30 by an inch or two to provide additional surface area for resisting the flow of grain into the pit.

The unloading ports 20 are in communication with the interior of the chamber 16 and are provided for facilitating removal of grain from the chamber. The storage pit 10 may be provided with any type and number of unloading ports 20.

As shown in FIGS. 1 and 2, an embodiment of the pit 10 comprises two unloading ports 20, each in the form of an elongated unloading tube having one end in communication with the interior of the chamber and an opposite end that extends above the grate 18. Each unloading tube may be approximately 6" in diameter and is configured for receiving an auger for removing the grain from the chamber 16. As shown in FIG. 1, each unloading tube may extend below the lower collection area of the pit so an auger placed therein can remove all of the grain in the chamber. In embodiments where two or more unloading tubes are provided, the tubes may be positioned adjacent one another or along opposite sides of the chamber.

As shown in FIG. 3, the unloading port 20 may also comprise a port or other opening in the lower collection area for discharging grain into a truck below the storage pit 10. The port may have a manually-actuated or powered valve or gate for controlling the discharge of grain from the chamber.

To install the grain pit 10, it is first delivered to an installation site and supported in an upright orientation by its base 28. The pit may be installed on a concrete pad 12 surrounding an excavated hole by lowering the pit into the hole until the ends of the supports 30 rest on the pad and the base 28 touches the bottom of the excavated hole as depicted in FIG. 2. Concrete approaches may then be poured around the pit so as to cover the ends of the supports. This generally flush-mounts the storage pit so that trucks may drive directly up to it and dump or otherwise unload grain into it through the grain-receiving grate 18. Grain may be subsequently removed from the pit with augers that fit inside the unloading tubes 20.

The storage pit 10 may also be supported in the roof or ceiling of a structure 14 so that trucks may drive on the structure and dump grain into the storage pit as depicted in FIG. 3. Other trucks may drive into the structure and under the storage pit to remove grain from the storage pit. Grain may be discharged from the unloading port 20 in the bottom of the chamber 16 directly into the trucks or onto a conveyor or other transport mechanism.

Although the invention has been described with reference to the preferred embodiment illustrated in the attached drawing figures, it is noted that equivalents may be employed and substitutions made herein without departing from the scope of the invention as recited in the claims. For example, although two specific installation options are discussed herein with reference to FIGS. 2 and 3, the storage pit 10 may be installed in other manners without departing from the scope of the invention.

Having thus described the preferred embodiment of the invention, what is claimed as new and desired to be protected by Letters Patent includes the following:

1. A grain storage pit comprising:
an open-top chamber configured to be substantially flush-mounted in a surface, the open-top chamber comprising:
a number of generally vertically-extending sidewalls;
a number of inwardly-sloping bottom walls depending from the vertically-extending sidewalls to define a lower collection area;
an upper circumferential lip extending outwardly from a top margin of the vertically-extending sidewalls;
a grain-receiving grate that covers at least a portion of the open-top chamber so that grain may be poured into the open-top chamber through the grate, the grate comprising:
a plurality of spaced-apart supports each being uniformly triangular in cross sections perpendicular to a longitudinal axis, the sections being narrowest at an upper end and widest at a lower end, and extending outwardly from the chamber for supporting the chamber when installed;
a plurality of cross treads supported by the supports, the supports being notched for receiving the cross treads, and the cross treads extending above the supports, extending at least a width of the chamber and being supported by the supports from underneath and sufficiently rigid and close to each other to cooperatively support a wheel of a loaded vehicle; and at least one unloading port in communication with an interior portion of the open-top chamber for facilitating removal of grain from the pit.

2. The grain storage pit as set forth in claim 1, wherein the triangular cross sections form a top angle of less than 90 degrees.

3. The grain storage pit as set forth in claim 1, wherein the treads are slats with the largest and thinnest dimensions oriented in a horizontal plane.

4. A grain storage pit comprising:
- an open-top chamber configured to be substantially flush-mounted in a surface, the open-top chamber comprising:
  - a number of generally vertically-extending sidewalls;
  - a number of inwardly-sloping bottom walls depending from the vertically-extending sidewalls to define a lower collection area;
  - an upper circumferential lip extending outwardly from a top margin of the vertically-extending sidewalls;
- a grain-receiving grate that covers at least a portion of the open-top chamber so that grain may be poured into the open-top chamber through the grate, the grate comprising:
  - a plurality of spaced-apart supports each being uniformly triangular in cross sections perpendicular to a longitudinal axis, the supports being narrowest at an upper end and widest at a lower end for guiding grain into the chamber and extending outwardly from the chamber for supporting the chamber when installed;
  - a plurality of cross treads supported by and extending above the supports, the supports being notched for receiving the cross treads;
- a lower opening for discharging the grain into a truck below the pit; and
- at least one unloading tube having one end in communication with an interior portion of the open-top chamber and an opposite end extending above the grain-receiving grate, the unloading tube sized and configured for receiving an auger for removing the grain from the open-top chamber.

5. A grain storage pit comprising:
- an open-top chamber configured to be substantially flush-mounted in a surface, the open-top chamber comprising:
  - a number of generally vertically-extending sidewalls;
  - a number of inwardly-sloping bottom walls depending from the vertically-extending sidewalls to define a lower collection area;
  - an upper circumferential lip extending outwardly from a top margin of the vertically-extending sidewalls;
- a grain-receiving grate that covers at least a portion of the open-top chamber so that grain may be poured into the chamber through the grate, the grate comprising:
  - a plurality of spaced-apart supports each being uniformly triangular in cross sections perpendicular to a longitudinal axis, the supports being narrowest at an upper end and widest at a lower end for guiding grain into the chamber and extending outwardly from the chamber for supporting the chamber when installed;
  - a plurality of cross treads supported by, extending above, and perpendicular to the supports, the supports being notched for receiving the cross treads;
- a lower opening for discharging the grain into a truck below the pit; and
- a plurality of unloading tubes each having one end in communication with an interior portion of the open-top chamber and an opposite end extending above the grain-receiving grate, the unloading tube sized and configured for receiving an auger for removing the grain from the open-top chamber.

6. The grain storage pit of claim 5, wherein the unloading tubes are parallel to each other.

7. The grain storage pit of claim 5, wherein the unloading tubes extend diagonally above and outwardly from the top of the storage pit.

\* \* \* \* \*